US007401808B2

(12) United States Patent
Rossbach et al.

(10) Patent No.: US 7,401,808 B2
(45) Date of Patent: Jul. 22, 2008

(54) INFLATOR HAVING AN IMPROVED CLOSURE CAP

(75) Inventors: Thomas Rossbach, Villmar (DE); Guido Klettenheimer, Kelsterbach (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 327 days.

(21) Appl. No.: 11/357,622

(22) Filed: Feb. 21, 2006

(65) Prior Publication Data
US 2007/0138776 A1    Jun. 21, 2007

(30) Foreign Application Priority Data
Dec. 20, 2005    (EP)    ................... 05027846

(51) Int. Cl.
*B60R 21/26* (2006.01)

(52) U.S. Cl. .............. 280/737; 280/741; 137/68.27; 137/68.3

(58) Field of Classification Search .............. 280/737, 280/741, 742, 736; 137/69, 68.23, 68.19, 137/68.25, 68.27, 68.29, 68.3; 102/530, 102/531
See application file for complete search history.

(56) References Cited

U.S. PATENT DOCUMENTS

| | | | | |
|---|---|---|---|---|
| 5,411,158 A | * | 5/1995 | Kays et al. ................... | 220/89.2 |
| 5,460,406 A | * | 10/1995 | Faigle ........................ | 280/741 |
| 5,601,308 A | * | 2/1997 | Cuevas ....................... | 280/736 |
| 5,711,547 A | * | 1/1998 | Blumenthal et al. ......... | 280/737 |
| 6,131,948 A | | 10/2000 | Cuevas et al. | |
| 6,247,725 B1 | | 6/2001 | Möller | |
| 6,254,128 B1 | * | 7/2001 | Albrecht et al. ............. | 280/736 |
| 6,746,044 B2 | * | 6/2004 | Elqadah et al. ............. | 280/736 |
| 6,981,718 B2 | * | 1/2006 | Blackburn ................... | 280/737 |
| 7,137,646 B2 | * | 11/2006 | Blackburn et al. ........... | 280/737 |
| 7,156,257 B2 | * | 1/2007 | de la Serna .................. | 222/5 |
| 7,226,078 B2 | * | 6/2007 | Green et al. ................. | 280/737 |
| 7,240,917 B2 | * | 7/2007 | Fogle et al. ................. | 280/739 |
| 2002/0130499 A1 | * | 9/2002 | Specht et al. ............... | 280/736 |
| 2002/0130500 A1 | * | 9/2002 | Specht ........................ | 280/736 |
| 2005/0242556 A1 | * | 11/2005 | Katsuda et al. ............. | 280/737 |
| 2007/0138775 A1 | * | 6/2007 | Rossbach et al. ............ | 280/736 |

FOREIGN PATENT DOCUMENTS

| | | |
|---|---|---|
| EP | 1 336 538 A | 8/2003 |
| EP | 1 346 885 A | 9/2003 |
| WO | WO 99/12775 A | 3/1999 |

\* cited by examiner

*Primary Examiner*—Kevin Hurley
*Assistant Examiner*—Drew J. Brown
(74) *Attorney, Agent, or Firm*—Lonnie Drayer

(57) ABSTRACT

An inflator has a sealed vessel for containing compressed gas. The inflator has an axis. The vessel has a gas outlet passageway. The inflator has an elongated sealing cap closure with an internal chamber portion open to the compressed gas and sealed vessel to seal the opening of the gas outlet passageway. The elongated sealing cap is coaxial with the inflator. When a triggering device is activated it exerts a force against the elongated sealing cap closure in a direction substantially parallel to the axis of the inflator that causes the elongated sealing cap closure to fail and allows gas to escape from the vessel.

6 Claims, 4 Drawing Sheets

INFLATOR HAVING AN IMPROVED CLOSURE CAP

FIELD OF THE INVENTION

The invention relates to an inflator that may be used for inflating an airbag.

DISCUSSION OF THE PRIOR ART

WO 99/12775 A teaches a device for inflating an airbag with compressed gas from a vessel. In this prior art device it is necessary that the device components have exact dimensions to avoid deviations in the force transmitted by a locking element for opening a gas pressure container intended to inflate an airbag. In addition to requiring several components to provide a locking feature at least one additional sealing component is required to provide an air-tight containment for the gas under pressure. Ideally, improved reliability and better precision can be achieved by reducing the number of components.

SUMMARY OF THE INVENTION

The device of the present invention overcomes the problem discussed above by providing a compressed gas filled inflator with a sealing cap closure having a frangible chamber wall open to the compressed gas which is sealed to an annular abutment wall with an outlet opening or passageway for discharging the compressed gas when a triggering device breaks the frangible chamber wall so the outlet opening or passageway is opened.

DETAILED DESCRIPTION OF THE INVENTION

Figure 1:
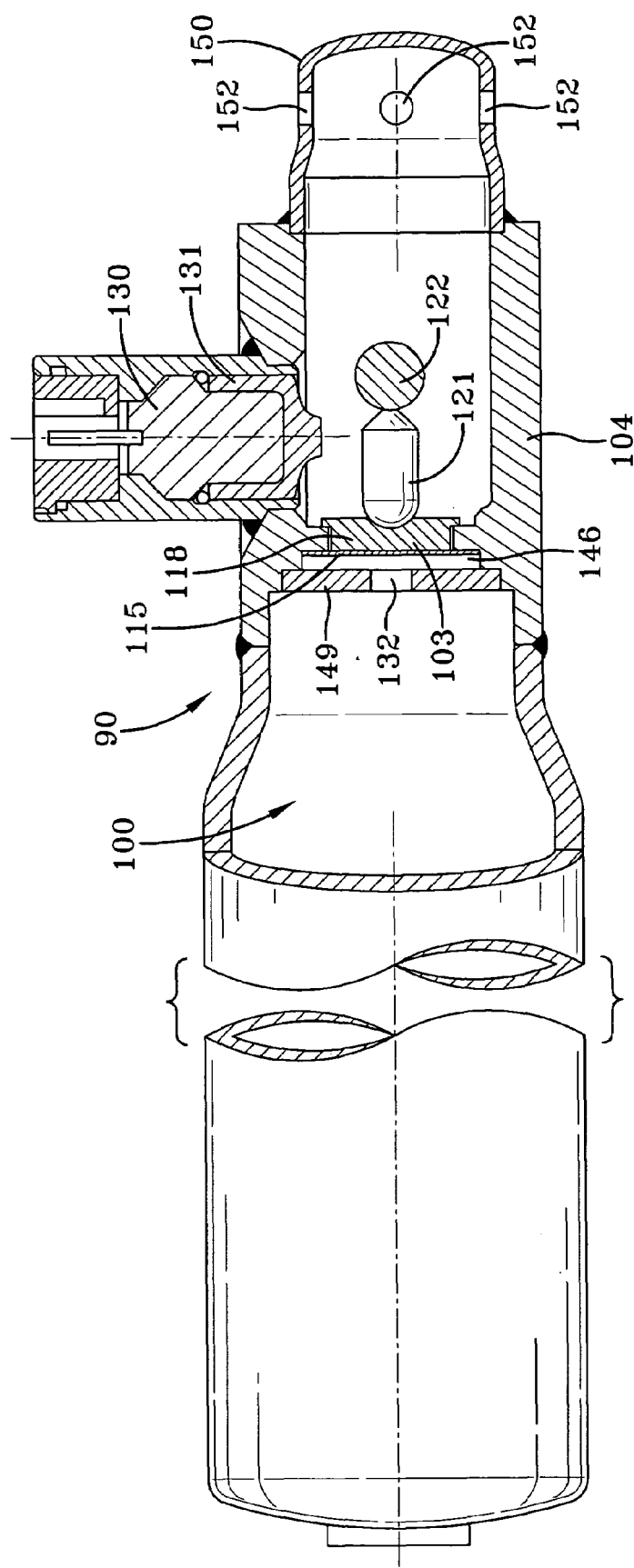
FIG. 1 is a longitudinal section of a prior art device.

FIG. 1 shows a prior art inflator 90 taught in WO 99/12775 A that can be used for inflating an airbag with compressed gas from a vessel. A gas storage vessel 100 includes an inflation head 104 that is contiguous to an outlet opening 103. The outlet opening is closed by a sealing element 115 that can be a metal foil. The sealing element 115 is attached to a supporting disc 118 that is located in the outlet opening 103. The supporting disc 118 is in turn supported by a centrally arranged locking element 121 at an abutment 122 against the opening forces exerted upon said sealing element 115 by the gas pressure inside the vessel 100. An opening device is fitted with a triggering mechanism 130 which, when actuated, displaces the locking element 121 and the sealing element 115, thereby opening the container outlet 103 and inflating an airbag through the exhaust port housing 150. The locking element 121 can be moved out of the locking position by a laterally acting force that is produced by a piston 131 propelled by the triggering mechanism 130, to open the gas outlet opening 103. It is suggested that to ensure that a pressure container will open and that an appropriate amount of gas will be released, a throttling member 149 having a flow restrictor opening 132 be provided in the gas storage vessel 100 in the path of gas exhaust upstream from the outlet opening 103, with a pressure chamber 146 between said throttling 149 and the outlet opening 103 in the bottleneck. In the known device, the load on the supporting disc 118 produced by the compressed gas is conveyed via the centrally located locking element 121 into the abutment 122 that is rigid with the vessel 100 containing compressed gas. For this purpose, it is necessary that the device components have exact dimensions in order to avoid deviations from the force transmission in the longitudinal axis of the locking element.

FIGS. 2-6 show an inflator 91 according to the present invention for inflating an airbag. Each of the devices employs a means for sealing the storage vessel 100 and storing compressed gas within the vessel with little or no leakage.

Figure 2:
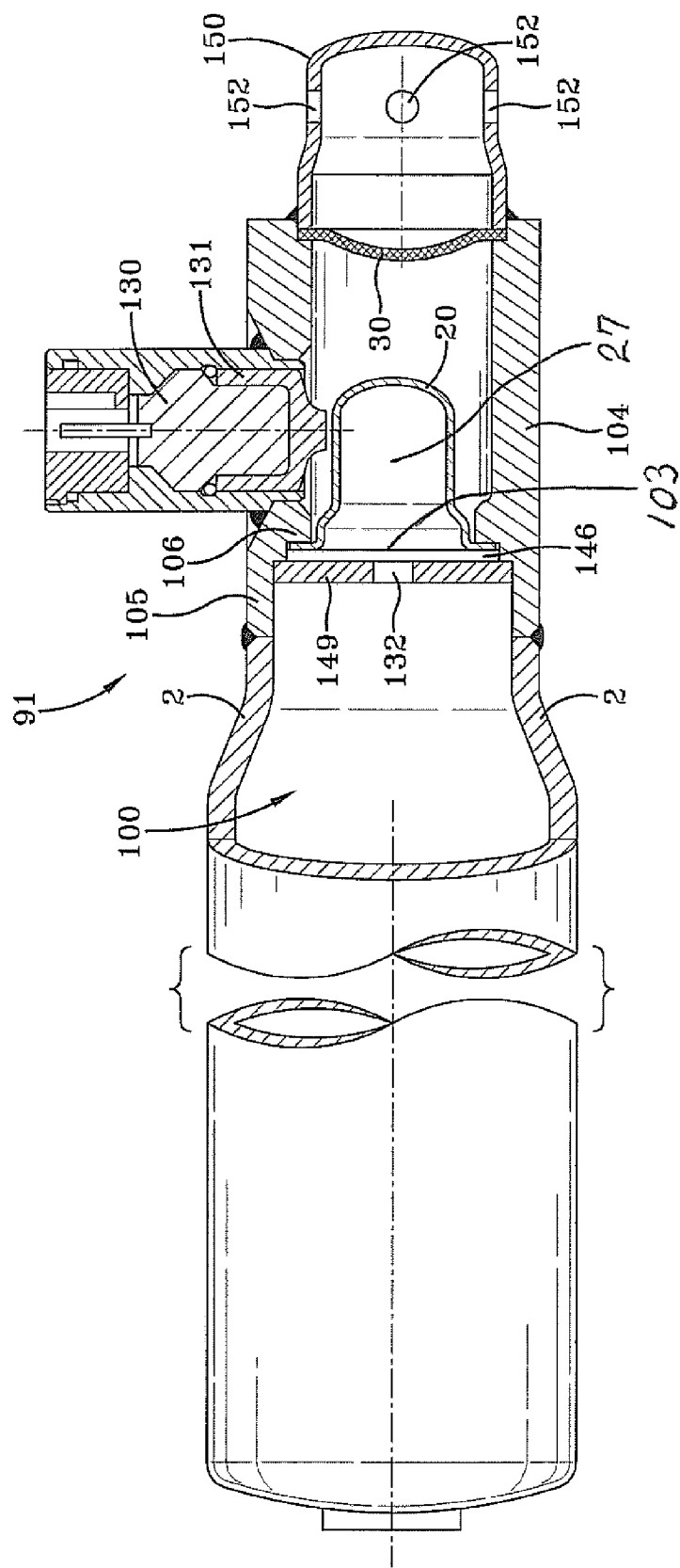
FIG. 2 is a longitudinal section of a first embodiment of the invention.

With reference to FIG. 2 the prior art inflator 90 shown in FIG. 1 has been modified to create an inflator 91 by replacing the sealing element 115, the supporting disk 118, the locking element 121, and the abutment 122 with a single sealing cap closure 20 of the present invention. Optionally the throttle 149 can be replaced as well.

Figure 3:
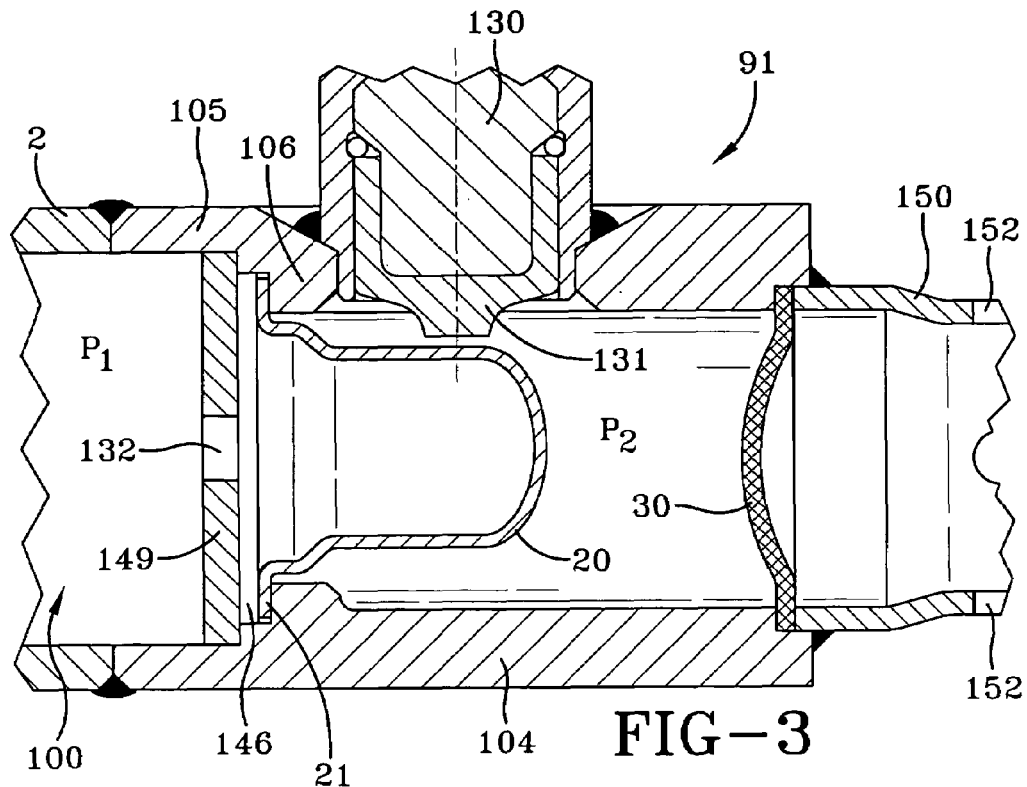
FIG. 3 is a cross section of the first embodiment shown in FIG. 2 taken at line 3-3 in FIG. 2.

With reference to FIG. 3 the gas storage vessel 100 of the inflator 91 necks down to have walls 2 that abut with walls 105 of the inflation head 104 that is contiguous with the outlet passageway or opening 103. Annular abutment walls 106 project inwardly from the walls 105 of the inflation head 104 to define the passageway or opening 103. A sealing cap closure 20 is inserted from the gas vessel direction through the passageway 103 as shown. A flange 21 on the cap closure 20 extends outwardly around an open end of the cap closure 20 and is sealed in an air-tight manner to a surface of the abutment wall 106, preferably welded to the abutment wall 106.

Figure 4:
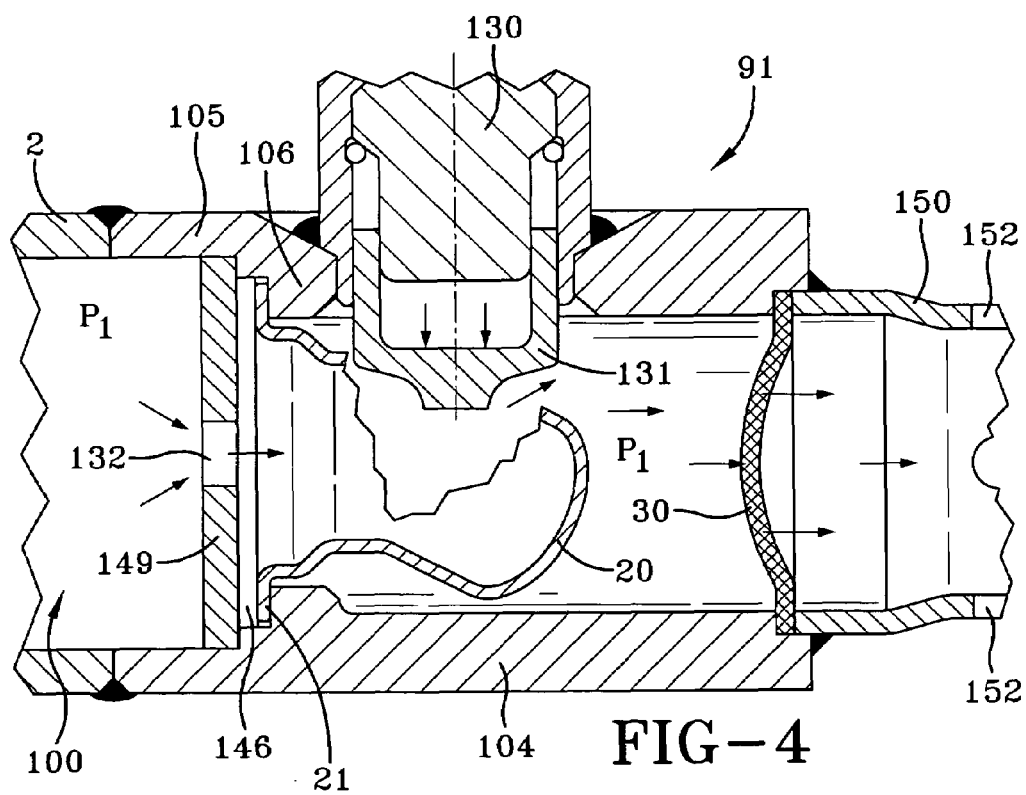
FIG. 4 is a view of the first embodiment of FIG. 3 wherein the triggering device is activated thereby breaking the frangible chamber wall of the sealing cap closure.

A triggering mechanism 130 is aligned with a portion 20 of the cap closure as shown. The illustrated inflator of the present invention has a longitudinal axis. The triggering mechanism 130 when actuated generates gas that drives a piston 131 in a direction substantially perpendicular to the longitudinal axis of the inflator such that the piston impacts the cap closure 20 breaking the cap closure 20 along a frangible portion 28 of a chamber wall allowing the compressed gases to escape and be released out of the exhaust ports 152 of the housing 150 attached to the inflation head 104 as illustrated in FIG. 4. Put another way, the triggering mechanism exerts a force against the cap closure in a direction substantially parallel to the longitudinal axis of the inflator that causes the closure to fail and allow gas to escape from the sealed vessel.

Interposed at the connection of the inflation head 104 and the exhaust port housing 150 is a filter or screen 30 which blocks any fragments from the closure cap 20 from escaping into the inflating airbag through the exhaust port openings 152. As shown the filter or screen 30 is preferably convexly curved in the direction of the impinging cap portions for increased strength.

The closure cap 20 as shown in FIGS. 2 and 3 has an internal chamber 27 open to the compressed gas which is stored at pressure $P_1$ of about 600 kPa as measured at ambient temperatures of about 25° C. Downstream of the compressed gas on the opposite side of the cap closure 20 the pressure $P_2$ in the inflation head 104 is approximately 1.0 bar or at atmospheric conditions. Once the inflator triggering device 130 is activated the piston 131 breaks the wall of a chamber portion 24 of the cap closure 20 along a seam line 28 between the larger chamber portion 24. As shown the torn opening can be sized to act as a throttle or choke point to control the rate of gas release and thereby eliminate the throttle element 149 previously required in the prior art inflator if so desired.

Figure 5:
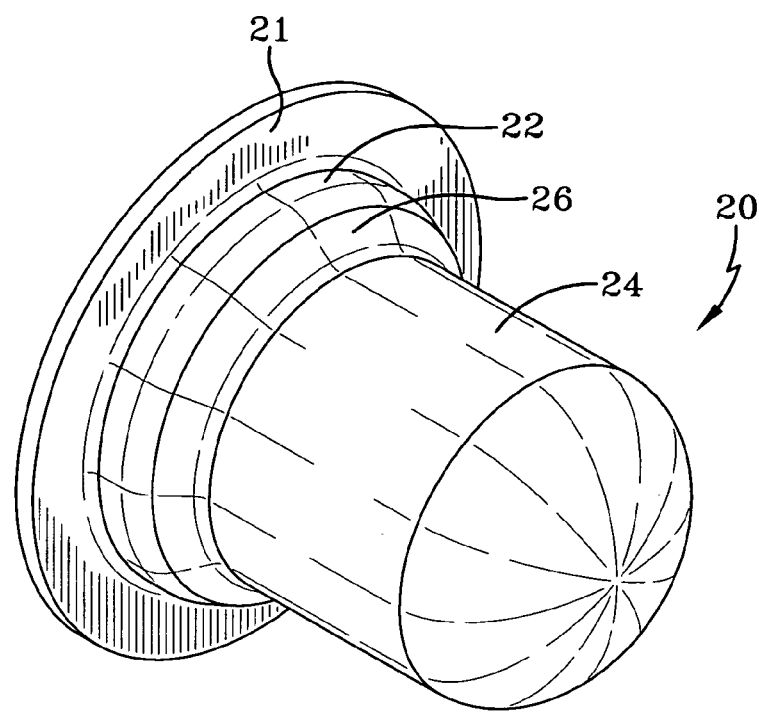
FIG. 5 is a perspective view of the sealing cap closure.
Figure 6:
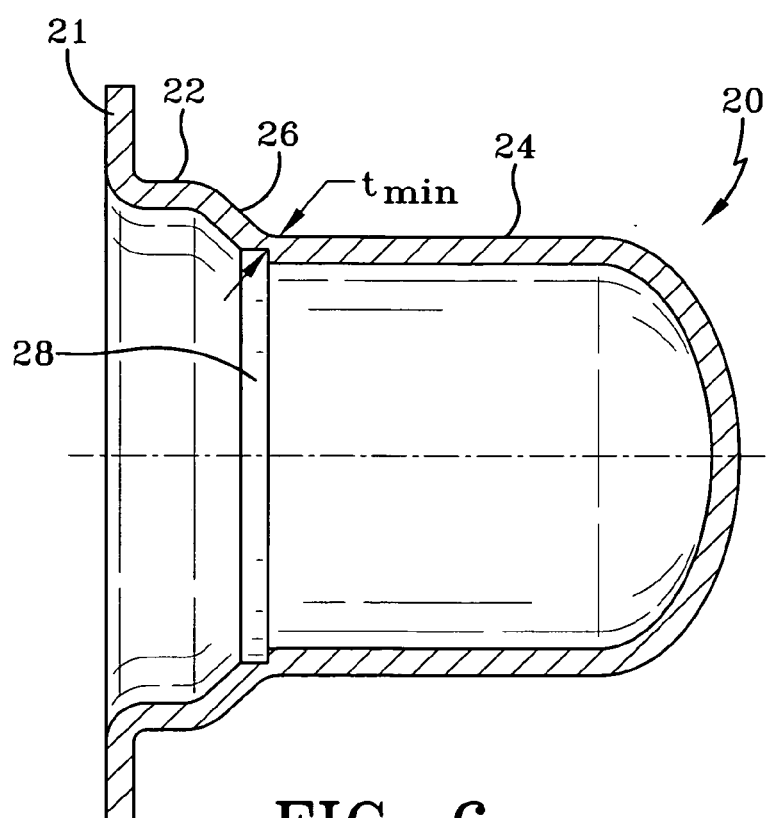
FIG. 6 is an enlarged cross sectional view of the sealing cap closure.

The sealing cap closure 20 is illustrated in FIGS. 5 and 6. The perspective view of the cap closure 20 shows the smooth outer surfaces of the cap closure 20 which is preferably made from a single piece of drawn metal or other structurally stable material produced in a deep draw process. The cap closure 20 as shown is preferably made of steel or aluminum or an alloy of such materials having a thickness of about 0.5 mm prior to the drawing process. The cap closure 20 has a sealing flange 21 at the end of the enlarged chamber portion 22 as previously noted. The enlarged chamber portion 22 is flared down 26 to a reduced sized closed end chamber portion 24 as shown. Between the two chamber portions 22, 24 a thin seam 28 having a thickness $t_{min}$ is preferably provided to insure the part breaks consistently at a known location. The chamber walls of each chamber portion 22 and 24 have a thickness greater than the minimum thickness $t_{min}$. Alternatively this seam line 28 can be on the internal surface or the external surface of the cap closure 20 and cut or otherwise formed along seam line 28 by laser cutting, machining, chemically etching or otherwise produced if so desired.

This secondary step to form the frangible tear or seam line 28 is believed optional to accommodate any variations in material thickness when forming the cap part 20 and is an optional manufacturing step that can be eliminated assuming the dimensional characteristics can be controlled to provide a reliable fracture by the piston 131 when it strikes the cap closure 20 upon triggering the triggering means 130.

In a further alternative embodiment of the present invention the cap closure 20 can be broken open by the explosive force of the triggering means 130 being directed onto the frangible portion of the cap closure without requiring the assistance of the piston 131. In such an optimal design the triggering means 130 would employ a squib or ignition device with a sufficient amount of ignition propellant to provide a force that impinges the cap closure 20 to cause the tearing or fracturing of the frangible portion along the thin seam line 28. Although not shown this alternative would be very similar to the device shown in FIG. 1, but without the piston 131.

As illustrated the sealing cap closure 20 is ideally suited for use with inflators employing a compressed gas. This includes hybrid inflators having a pyrotechnic charge as well.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

The invention claimed is:

1. An inflator comprising a vessel containing compressed gas, the vessel having a gas outlet passageway defined by an annular abutment wall with a central opening, the inflator having a sealing cap closure having a sealing flange sealed to the annular abutment wall to seal the opening of the gas outlet passageway; the interior of the sealing closure cap being a chamber that is open to the compressed gas in the vessel with the chamber comprising a large diameter chamber portion adjacent the sealing flange with the large diameter chamber portion being flared down to a smaller diameter closed end chamber portion with a thin walled frangible seam disposed in a side wall of the sealing closure cap between the two chamber portions; and a triggering device that when activated generates gas that drives a piston in a direction substantially perpendicular to a longitudinal axis of the inflator such that the piston impacts the side wall of the sealing cap closure and breaks the side wall of the sealing cap closure at the thin walled frangible seam thereby allowing gas to escape from the vessel.

2. The inflator according to claim 1 further comprising an exhaust port housing having one or more exhaust ports for allowing the gas to pass therethrough to inflate an airbag.

3. The inflator according to claim 2 further comprising a filter located between the sealing cap closure and the one or more exhaust ports.

4. The inflator according to claim 1 wherein the sealing flange is secured to a surface on the annular abutment wall on a compressed gas containing portion of the vessel.

5. The inflator according to claim 4 wherein the sealing flange is welded to the annular abutment wall.

6. The inflator according to claim 1 wherein the sealing cap closure is formed as a drawn metal part.

\* \* \* \* \*